May 22, 1934.　　　　J. T. BRUBAKER　　　　1,959,566
PACKING ARRANGEMENT
Filed Dec. 21, 1933
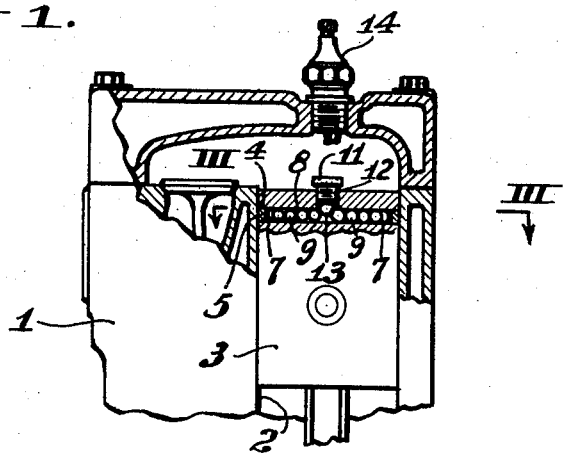
Fig. 1.
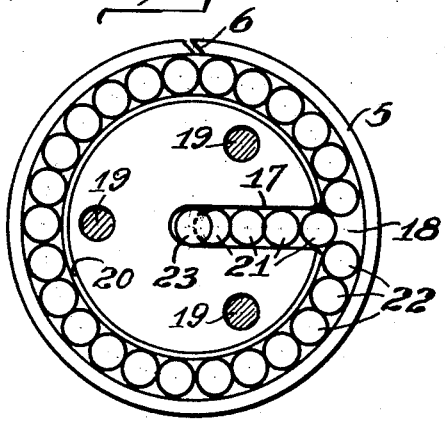
Fig. 4.
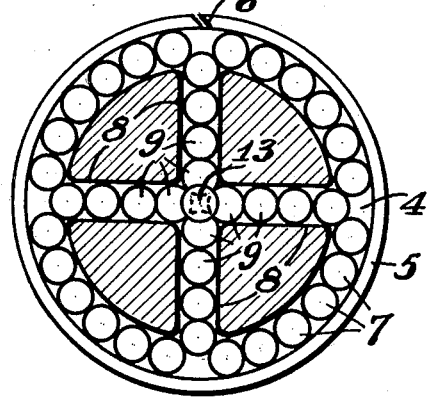
Fig. 3.
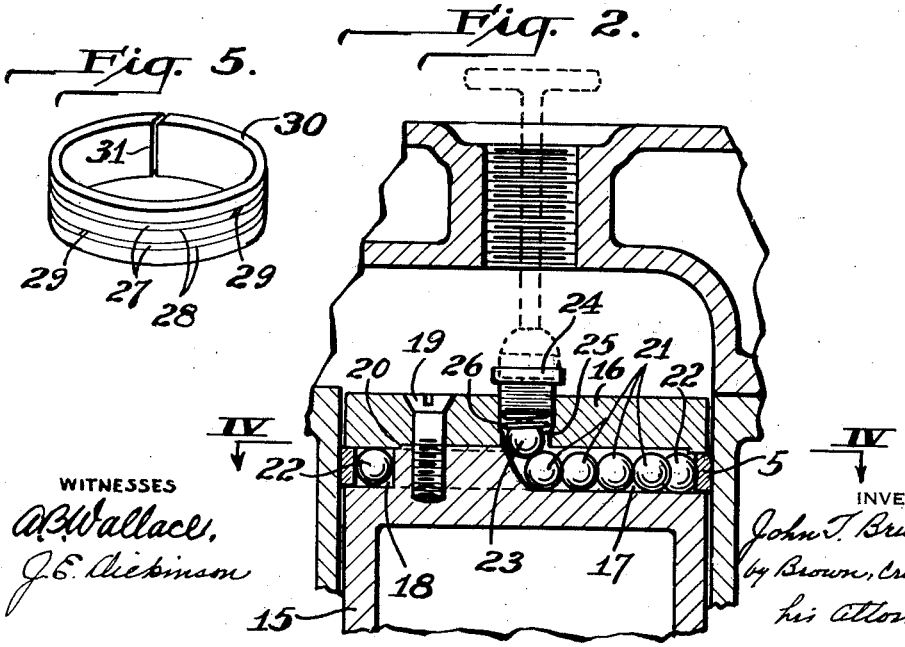
Fig. 5.
Fig. 2.
WITNESSES
A. B. Wallace
J. E. Dickinson
INVENTOR
John T. Brubaker
by Brown, Critchlow & Flick
his Attorneys Patented May 22, 1934

1,959,566

UNITED STATES PATENT OFFICE 1,959,566

PACKING ARRANGEMENT

John T. Brubaker, Wilkinsburg, Pa.

Application December 21, 1933, Serial No. 703,387

8 Claims. (Cl. 309—35)

My invention relates to a packing arrangement designed for use on reciprocating elements, and more particularly to a packing arrangement of the piston ring type.

Engine pistons and reciprocating elements of that nature are as a rule equipped with piston rings for preventing the escape of fluid past the piston as wear occurs between it and the cylinder in which it moves. Customarily these rings are made of spring steel, or the like, and mounted to fit somewhat loosely in annular grooves provided in the piston and in sizes adapting them to tend to constantly contact the cylinder wall. As they and the cylinder wall wear away, however, they lose this contact and permit whatever fluid pressure to which they are subjected to escape. When this condition develops, which it does and quite frequently, particularly in automobile engines and engines subjected to that type of service, it is necessary to replace these rings. This usually entails practically dismantling such engines, which is a difficult and costly operation, and not uncommonly, due to the cylinders having worn non-uniformly, the new rings will not function properly as they will not assume the shape of the cylinder under their own pressure.

With this difficulty in mind, it is the primary object of my invention, generally speaking, to provide a packing arrangement for use in conjunction with a piston ring type of packing which is adapted to greatly increase the life of a piston ring, and to provide for easily and readily adjusting such a ring at frequent intervals so that it may be operated continuously at maximum efficiency and at the same time insure its being maintained in constant and uniform contact with the cylinder wall over its entire length at all times.

Another object is to provide an improvement of the aforementioned character which is simple and inexpensive to manufacture and install, and which is adapted to be serviced by an inexperienced person, as well as an expert mechanic.

These and other objects, as well as the various other novel features and advantages of the invention, will be apparent when the following detailed description is read in conjunction with the accompanying drawing, in which Fig. 1 is a view partly in elevation and partly in section of an internal combustion engine provided with a piston construction incorporating my invention; Fig. 2 a view similar to Fig. 1 showing another form of the invention on a somewhat larger scale; Fig. 3 a section taken through the piston on the line III—III of Fig. 1; Fig. 4 a view similar to Fig. 3 taken on the line IV—IV of Fig. 2; and Fig. 5 a perspective view of a modified form of piston ring devised for use in accordance with my invention.

As will be readily appreciated by those skilled in the art, from the following description my invention may be placed to numerous uses and be employed with various forms of reciprocating elements. However, for convenience it will be described only in connection with its use in an engine of the type employed in an automobile where it has its greatest application, as now contemplated, and where the problem solved by it appears at its worst.

Referring to the drawing, the numeral 1 designates the cylinder block of an ordinary automobile engine in the cylinder bore 2 of which a piston 3 is arranged for reciprocating movement in the usual manner. As shown in this figure and in Fig. 3 an annular groove 4 is provided in this piston for the reception of a piston ring 5. This ring, like the usual piston ring, is split at 6 to permit its being expanded into contact about its periphery with the cylinder wall as the latter, with the ring, wears through use, and except that it may be made thicker, as will be better appreciated from the following description, to increase the length of its life, it need not otherwise differ from the ordinary ring.

In accordance with the invention the groove 4 in which the piston ring 5 is placed is made sufficiently deep to receive a row of balls 7, these balls being used for uniformly expanding the ring to maintain it in contact with the cylinder as the ring and cylinder wear. In order that the balls may be made to function in this manner a plurality of radial grooves 8 are extended from the center of the piston into the outer ring supporting groove 4, and in these there are also arranged a series of contacting balls 9 which are so arranged that they may be forced outwardly in such a manner that they will crowd between the balls 7 in the ring groove 4, as shown best in Fig. 3, and cause the balls 7 to apply a uniform expanding pressure to the ring 5.

To apply a radial force to the balls 9 in the pressure grooves 8 an adjustable plug 11 is threadably mounted in a vertical hole 12 extending from the top of the piston 5 into the inner ends of the radial grooves 8. Below this plug there is mounted a ball 13 which, when the plug is screwed down, wedges itself between the inner balls 9 in the different radial grooves 8 and thereby forces the latter outwardly between the balls 7.

For convenience and efficiency the plug 11 is provided with a non-circular development or recess on its upper end for the reception of an adjusting tool, as shown in Fig. 2, and so arranged that it may be adjusted by inserting such a tool through the opening in which the spark plug 14 of the engine is mounted. Consequently, instead of dismantling the engine to take care of the rings of an engine as they and the cylinder wear away, all that it is necessary to do is to remove the spark plugs and adjust the plugs 11, and as will be appreciated this may be done with very little difficulty at frequent intervals, which is recommended.

While in the foregoing description the invention has been described in connection with one of its simpler forms a very desirable form of manufacture, as shown in Figs. 2 and 4, is to provide the piston 15 with a removable head 16 which is adapted to form a cover for the ball-receiving grooves 17 and 18. This cover is made to fit directly over these grooves being held in place by a plurality of suitable screws 19 and also provided with a shoulder 20 for locking it in place to thereby increase the rigidity of the structure.

To further simplify this latter form of the invention only a single radial groove 17 is employed. This, however, with groove 18, is filled with balls 21 and 22 in the same fashion as corresponding grooves 8 and 4 in the previous embodiment. To facilitate the movement of the ball 23, which is arranged under the adjusting plug 24, the inner end of the groove 17 is tapered or rounded into the vertical plug-receiving opening 25 and to take up any play which may occur between the balls between adjustments of the plug 24 a coil spring 26 is mounted between the lower end of such plug and the wedging ball 23. This also tends to function as a lock for the plug 24 although other well known locking means may be employed to prevent its turning between adjustments.

As a further feature of the invention, as shown in Fig. 5, the packing rings 30 which are employed may themselves be equipped with a plurality of auxiliary split rings 27 which are mounted in grooves 28 provided in the main ring 26 and adapted to lay flush with the outer surface thereof but so arranged that their openings 29 are displaced with respect to the split or opening 31 of the main ring thereby insuring uniform contact with the cylinder wall around the entire periphery of the piston.

According to the provisions of the patent statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. In combination with a moving element of the type disposed for movement in a cylindrical bore, an expansible packing ring mounted in an annular groove provided for its reception on the periphery of said element, a plurality of balls mounted in contact with each other in said groove behind said ring, a radially disposed groove communicating with said annular groove, a series of balls arranged in said radial groove in a manner to be forced between the balls in said annular groove and means for radially adjusting the positions of the balls in said radial groove to expand said ring.

2. In combination with a cylindrical surface with which a cooperating surface is adapted to have relative movement, an expansible packing ring mounted in an annular groove provided for its reception in said surface, a plurality of balls mounted in contact with each other in said groove behind said ring, a secondary groove disposed to communicate with said annular groove at right angles thereto, a series of balls arranged in said secondary groove in a manner to be forced between the balls in said annular groove and means for adjusting the positions of the balls in said radial groove to alter the diameter of said ring.

3. In combination with a tubular element of the type adapted to move in a cylindrical bore, an expansible packing ring mounted in a groove provided for its reception on the surface of said cylindrical element, a series of balls arranged in said groove behind said ring, a duct disposed in said element at right angles to said groove and terminating therein, means in said duct for applying a wedging force to said balls to expand said ring and means for readily adjusting said wedging means.

4. In combination with a piston, an expansible piston ring mounted in an annular groove in said piston, a series of balls arranged in said groove behind said ring, a radially disposed tunnel in said piston connecting with said annular groove, a series of balls mounted in said tunnel, and means mounted in the end of the piston for adjustably forcing the balls in said tunnel outwardly into said annular groove to expand said piston ring.

5. In combination with a piston, an expansible piston ring mounted in an annular groove in said piston, a series of balls arranged in said groove behind said ring, a radially disposed tunnel in said piston connecting with said annular groove, a series of balls mounted in said tunnel, and resilient means interposed between said adjustable means and the balls in said tunnel tending to constantly force said balls into said groove.

6. In combination with a cylindrical surface with which a cooperating surface is adapted to have relative movement, a main expansible packing ring mounted in an annular groove provided for its reception in said surface, a plurality of auxiliary expansible packing rings mounted in spaced annular grooves in said main ring, a series of balls mounted in contact with each other in said groove behind said main ring, a secondary groove disposed to communicate with said first annular groove at right angles thereto, a series of balls mounted in said secondary groove, and means for adjustably forcing said latter balls into said annular groove.

7. In combination with a moving element of the type disposed for movement in a cylindrical bore, an expansible packing ring mounted in an annular groove provided for its reception on the periphery of said element, a plurality of balls mounted in contact with each other in said groove behind said ring, a plurality of radially disposed grooves communicating with said annular groove, a series of balls arranged in each of said radial grooves in a manner to be forced between the balls in said annular groove and means for radially adjusting the position of the balls in said radial grooves to expand said ring.

8. In combination with a piston, an expansible piston ring mounted in an annular groove in said piston, a series of balls arranged in said groove behind said ring, a radially disposed tunnel in said piston connecting with said annular groove, a series of balls mounted in said tunnel, means mounted in the end of the piston for adjustably forcing the balls in said tunnel outwardly into said annular groove to expand said piston ring, and a detachable head for said piston disposed to form a cover for said balls.

JOHN T. BRUBAKER.